3,840,568
ESTRATRIENE DERIVATIVES
Rinaldo Gardi, Carate Brianza, Milan, Romano Vitali, Casatenovo, Como, and Giovanni Falconi, Milan, Italy, assignors to Warner-Lambert Company, Morris Plains, N.J.
No Drawing. Filed Nov. 15, 1972, Ser. No. 306,637
Claims priority, application Italy, Nov. 24, 1971, 31,575/71
Int. Cl. C07c *169/08*
U.S. Cl. 260—397.5      3 Claims

ABSTRACT OF THE DISCLOSURE

The disclosure describes 17-benzoates of 17α-alkynyl substituted estradiol 3-cyclopentyl ether which are useful as estrogens and as sterilizing agents for the control of rodents.

DESCRIPTION OF THE INVENTION

The present invention relates to new estratriene derivatives having sustained estrogenic and antigonadotrophic activities. More particularly this invention relates to 17-benzoate esters of 17α-alkynyl estradiol 3-cyclopentyl ether having the following structural formula:

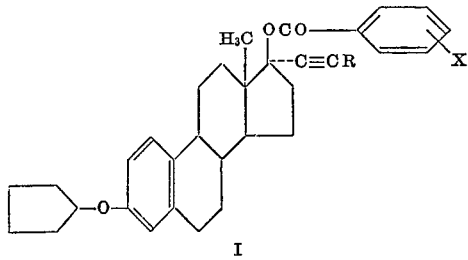

I wherein R is hydrogen, chloro, methyl or ethyl and X represents hydrogen, halogen, particularly fluorine or chlorine, lower alkyl, a hydroxy group free or etherified with a lower alkyl group, or a nitro group. The term "lower alkyl" as used herein denotes an alkyl radical containing up to 3 carbon atoms, i.e. methyl, ethyl, propyl or isopropyl. The possible X substituent as defined above is preferably present in para position of the benzene ring.

Preferred species of the above compounds are:

17-benzoate of 17α-ethynyl estradiol 3-cyclopentyl ether,
17-p. chlorobenzoate of 17α-ethynyl estradiol 3-cyclopentyl ether,
17-benzoate of 17α-chloroethynyl estradiol 3-cyclopentyl ether,
17-p. chlorobenzoate of 17α-chloroethynyl estradiol 3-cyclopentyl ether,
17-benzoate of 17α-(1-propynyl)estradiol 3-cyclopentyl ether, and
17-benzoate of 17α-(1-butynyl)estradiol 3-cyclopentyl ether.

The new compound of this invention are potent estrogenic agents endowed with a prolonged uterotrophic activity upon oral administration. They exhibit increased gonadotropin inhibition over prevously known hormonal agents and are orally effective in inducing a long lasting ovarian inhibition in female animals, particularly in rodents, thus suppressing the ovulation and consequently reducing their reproduction capacity.

The 17-benzoate and 17-p. chlorobenzoate of 17α-ethyl estradiol 3-cyclopentyl ether which are the especially preferred compounds of this invention are at least three times more potent as estrogens and five times more active as ovarian inhibitors than the already known quinestrol (or 3-cyclopentyl ether of 17α-ethynyl estradiol). Further they are able to induce high and prolonged inhibition of testes in male animals.

On account of their high inhibiting effect on the ovulation and fertility of animals, the new 17-benzoates of 17α-alkynyl estradiol 3-cyclopentyl ether and particularly the 17-benzoate and chlorobenzoate of quinestrol may be usefully employed as sterilizing agents for the control of rodents, particularly mice and rats, in order to reduce the propagation of this noxious animal species.

For this purpose the subject compounds are incorporated to baits which may be prepared and placed in natural feeding areas for rats, such as garbage and dumping-places. The compounds may be directly added in pulverulent form to edible substances, and particularly to cereals, or may be dissolved in oily vehicles such as vegetable oils, or suspended in liquids such as water and milk and the solutions or suspensions thus obtained are used for the preparation of baits.

A particular advantage offered by the compounds of this invention over analogous compounds, previously proposed as sterilizing agents, resides in that they have a longer duration of activity and when given in a single oral dose they exhibit an inhibiting effect in adult rats which lasts for many weeks. Further, they are effective at low doses and small amounts are sufficient to suppress for a long time the reproduction of rodents and hence to disinfest inhabited places. In general, the new compounds are added to rodents baits at concentrations from about 0.0001% to about 1% and preferably from about 0.001% to 0.1% by weight.

The 17-benzoates of 17α-alkynyl estradiol 3-cyclopentyl ether are also useful as hormonal estrogenic agents and may find application in gynecology, whenever the use of an oral estrogen is required, i.e. for inhibiting lactation, in cases of female hypogonadism and usually in the treatment of menopausal conditions. The subject compounds may also be advantageously used—alone or in combination with progestrogens—for inhibiting ovulation in women and therefore for birth control.

Since the compounds are orally active, they may be administered in admixture with any pharmaceutically acceptable carrier suitable for oral administration. When a solid carrier is used, the pharmaceutical preparation may take the form of tablets, pills, sugar-coated pills, troches or capsules prepared according to the usual pharmaceutical techniques. When a liquid carrier is used, the preparation may take the form of solution or suspension, suitable to be administered dropwise or contained in capsules. Preferably the compounds of this invention are administered in a solution of vegetable and edible oils.

The amount of the active compound which is contained in the pharmaceutical compositions of this invention may vary from about 0.001 to about 10 mg., and preferably from 0.01 to about 5 mg. per dosage unit. The administration is by the oral route and the dosage depends on the conditions to be treated and the nature of the desired results. For example, in the treatment of menopausal conditions effective results are obtained upon administration of a daily dosage of from about 10γ to about 100γ, or of a weekly dosage of from about 100γ to about 1 mg.

Where the active compound is to be used to suppress lactation, it is desirably administered in a single dose of from about 1 mg. to about 5 mg. and, if necessary, the treatment may be repeated after a few days. Where it is desired to control ovulation and fertility, the compound is preferably administered in a single monthly dose of from about 0.5 mg. to about 3 mg. together with a progestogenic agent.

The method of this invention thus comprises internally administering, in an amount sufficient to produce the desired therapeutic or hormonal effect, a 17-benzoate of 17α-alkynyl estradiol 3-cyclopentylether admixed with a nontoxic pharmaceutical carrier.

The new ester derivatives of this invention are prepared by acylation of the corresponding 3-cyclopentyl ether of 17α-alkynyl estradiol. The acylation may be carried out by treating the parent 17-hydroxy compound with the appropriate acid anhydride or acid chloride (corresponding to the acid of the formula

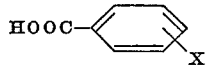

wherein X has the above stated meaning), in the presence of suitable basic condensing agents, such as pyridine.

In general, the 3-cyclopentyl ethers of the parent 17-hydroxy compound starting materials, are either known or can be prepared readily from the corresponding 3-cyclopentyl ether of estrone or of 17α-ethynyl estradiol, the preparation of which is fully described in U.S. Pat. No. 3,159,543.

In particular, the 17α-chloroethynyl estradiol 3-cyclopentyl ether may be obtained from 3-cyclopentyl ether of estrone by condensation with sodium chloroacetylide in liquid ammonia or with lithium chloroacetylide under Grignard type conditions, according to the method described by Burgess et al. in J. Chem. Soc., 1962, 4995.

The 3-cyclopentyl ethers of 17α-(1-propynyl) and 17α-(1-butynyl) estradiol (chemically, 21-methyl-19-nor-17α-pregna-1:3:5(10)trien-20-yne-3,17β-diol 3 - cyclopentyl ether and 21 - ethyl - 19 - nor - 17α - pregna - 1:3:5(10) trien - 20 - yne - 3,17β - diol 3 - cyclopentyl ether), which appear to be undisclosed in the literature, may be prepared from 17α-ethynyl estradiol 3-cyclopentyl ether by first converting the 17-hydroxy group of the starting compound into a 17β-tetrahydropyranyl ether, and alkylating then at the $C_{21}$ position according to known methods, for example by converting the ethynyl compound into a $C_{21}$-metallic derivative and by condensing this latter with methyl or ethyl iodide or sulphate. Regeneration of the 17β-hydroxyl group with ethanolic p. toluenesulphonic or oxalic acid gives the desired 21-methyl or ethyl derivative of 17α-ethynyl estradiol 3-cyclopentyl ether.

The compounds of this invention may be also prepared by an alternate route starting from the corresponding 17-benzoates of 17α- alkynyl estradiol and etherifying the 3-hydroxy group of the parent compound by treatment with cyclopentyl bromide or chloride in the presence of a suitable acceptor, such as sodium or potassium ethylate or carbonate. The 17-benzoates of 17α-alkynyl estradiol, starting materials for this process, are in general undisclosed in the literature. However, they may be readily prepared by partial saponification of the corresponding 3,17-dibenzoates which, in their turn, are obtained by submitting the parent compound, 17α-alkynyl estradiol, to complete esterification according to well-known methods.

The following procedures illustrate the preparation of the starting materials employed for carrying out the invention.

PREPARATION 1

17α-chloroethynyl estradiol 3-cyclopentyl ether

Sodium (2 parts by weight) and ferric nitrate (0.05 part) were slowly added to liquid ammonia (200 parts) and the mixture was stirred under reflux until the blue colour disappeared. The mixture was cooled to −60° C. and trans-dichloroethylene (4.3 parts by weight) in anhydrous ether (20 parts) was added during 15 minutes. The cooling bath was removed and the mixture stirred under reflux for 30 minutes. A solution of estrone 3-cyclopentyl ether (6 parts) in anhydrous tetrahydrofuran (100 parts) was added during 15 minutes and the mixture stirred under reflux for 3 hours. Ammonium chloride (12 parts) was added and the ammonia was allowed to evaporate. Water and ether were added to the residue, the organic layer was separated, washed with water, dried over anhydrous sodium carbonate and evaporated to dryness. The crude 17-chloroethynyl estradiol 3-cyclopentyl ether thus obtained was purified by crystallization from methanol.

The same product was obtained by reacting estrone 3-cyclopentyl ether with lithium chloroacetylide as follows: a solution of methyl iodide (3 parts by weight) in anhydrous ether (80 parts) was added to a stirred suspension of lithium (3 parts) in anhydrous ether (150 parts). The mixture was refluxed for 15 minutes and then cooled to 0° C. Thereafter, trans-dichloroethylene (12 parts) in anhydrous ether (40 parts) was added slowly during 30 minutes to the stirred mixture, under nitrogen atmosphere. The stirring was continued for a further 1 hour while the mixture was allowed to reach room temperature. To the resulting solution of lithium chloro acetylide, still under nitrogen, there was added during 30 minutes a solution of estrone 3-cyclopentyl ether (7 parts) in anhydrous toluene (200 parts). After stirring for more than 1 hour under reflux, the reaction mixture was cooled to −60° C. Saturated aqueous ammonium chloride was added and the stirred mixture was allowed to reach room temperature. The crude 17-chloroethynyl estradiol 3-cyclopentyl ether was isolated by extraction with ether and purified by crystallization from methanol; $\lambda_{max}$ 280 and 289 mμ (ε 2090 and 1810).

PREPARATION 2

21-methyl-19-nor-17α-pregna-1,3,5(10)-trien-20-yne-3,17β-diol, 3-cyclopentyl ether A solution of 17α-ethynyl estradiol 3-cyclopentyl ether (4 g.) in 100 ml. of tetrahydrofuran was treated with 2:3-dihydropyran (10 ml.) followed by phosphorus oxychloride (0.08 ml.). After 2½ hours at room temperature the mixture was poured into dilute aqueous sodium bicarbonate solution and the product isolated with ether to obtain the 17β-tetrahydropyanyl ether of 17α-ethynyl estradiol 3-cyclopentyl ether.

The crude compound (2 g.) in dry ether (60 ml.) was added over 30 minutes to a stirred solution of ferric nitrate (0.1 g.) and lithium (0.4 g.) in liquid ammonia (80 ml.) maintained at a temperature just below the boiling point. The mixture was stirred for 2½ hours, methyl iodide (6 ml.) in 20 ml. of ether was added during 30 minutes, and the stirring continued for further 3 hours. Ammonium chloride was then introduced, and the ammonia allowed to evaporate. The steroidal product was isolated with ether and purified from aqueous acetone containing a trace of pyridine, to give the 17β - tetrahydropyranyl ether of 3,17β-dihydroxy-21-methyl-19-nor-17α-pregna-1,3,5(10)-trien-20-yne-3-cyclopentyl ether.

This compound in ethanol solution was treated with 2% aqueous oxalic acid, the mixture was heated under reflux for 30 minutes and, after cooling, diluted with water and extracted with ether. Chromatography of the product gave 21-methyl-19-nor-17α-pregna - 1,3,5(10) - trien-20-yne-3,17β-diol 3 - cyclopentyl ether (17 - propynylestradiol 3-cyclopentyl ether) which was purified from methanol; $\lambda_{max}$ 280–281 mμ (ε 2150), and 289 mμ (ε 1785).

PREPARATION 3

21-ethyl-19-nor-17α-pregna-1,3,5(10)-trien-20-yne-3,17β-diol, 3-cyclopentyl ether The above compound was prepared by the procedure described in Preparation 2, with the exception that ethyl iodide was employed in place of methyl iodide at the alkylation stage. The compound was crystallized from aqueous methanol; $\lambda_{max}$ 279–280 mμ (ε 2320) and 287–288 mμ (ε 1800).

The following examples illustrate the preparation and activity of the compounds of this invention and are not to be considered as limiting.

EXAMPLE 1

17-benzoate of 17α-ethnyl estradiol 3-cyclopentyl ether

Method (a).—To a solution of quinestrol (3 g.) in pyridine (15 ml.) and chloroform (10 ml.), kept under stirring and cooled to 0–5° C. with an external ice-bath, a previously prepared and cooled solution of benzoyl chloride (3.5 ml.) in pyridine (6 ml.) and chloroform (30 ml.) was added dropwise. The reaction mixture was kept overnight in the refrigerator and then poured into ice water and extracted with methylene chloride. The organic extract was washed with diluted hydrochloric acid, with an aqueous solution of sodium bicarbonate and water and then was dried over sodium sulfate. After removal of the solvent under reduced pressure, the solid residue was recrystallized from 2.5 g. of methylene-chloride methanol to give quinestrol 17-benzoate; m.p. 215–217°, $$[\alpha]_D = +26.7°$$

(dioxane, c.=1); $\lambda_{max}$ 228–229 m$\mu$ ($\epsilon$ 23,600), 279–280 m$\mu$ ($\epsilon$ 2690), 286–87 m$\mu$ ($\epsilon$ 1795).

Method (b).—17α-ethynyl estradiol was treated with an excess of benzoyl chloride under the conditions described in Method (a) to give the corresponding 3,17-dibenzoate. Grams 5 of this compound in a (6:1) solution of methanol-tetrahydrofuran were reacted with 15 ml. of 1M sodium methylate. The reaction mixture was kept for 40 minutes at room temperature, then was concentrated in vacuo and the residue taken up with water. The precipitate, collected by filtration and recrystallized from methanol, consisted of 17α-ethynyl estradiol 17-benzoate.

A solution of 2 g. of this intermediate in 100 ml. of pure ethanol was treated with 4 g. of cyclopentyl bromide and 10 ml. of 1M sodium ethylate. The mixture was heated under reduced pressure and the residue was diluted with water. The precipitate was collected by filtration, washed with water, dried and recrystallized from methylene chloridemethanol to give 3-cyclopentyl ether of 17α-ethynyl estradiol 17-benzoate identical to the product prepared by Method (a) above.

EXAMPLE 2

17-p. chlorobenzoate of 17α-ethynyl estradiol 3-cyclopentyl ether

The above compound was prepared by reacting 5 g. of quinestrol with 5.5 ml. of p. chlorobenzoyl chloride, under the conditions described in Method (a) of Example 1. The 17-p. chlorobenzoate (5.05 g.) thus obtained was crystallized from methanol, M.P. 198–200° $[\alpha]_D = +30.7°$ (dioxane, c.=1); $\lambda_{max}$ 233 m$\mu$ ($\epsilon$ 23,870), 278 m$\mu$ ($\epsilon$ 2540), 288 m$\mu$ ($\epsilon$ 1840).

EXAMPLE 3

17-benzoate of 17α-chloroethynyl estradiol 3-cyclopentyl ether

The 3-cyclopentyl ether of 17α-chloroethynyl estradiol, obtained as described in Preparation 1, was treated with benzoyl chloride in chloroform solution containing pyridine by a procedure similar to that described in Method (a) of Example 1 to give the corresponding 17-benzoate; $\lambda_{max}$ 280 m$\mu$ ($\epsilon$ 2210), and 288–289 m$\mu$ ($\epsilon$ 1820).

EXAMPLE 4

17-benzoate of 17α-(1-propynyl)estradiol 3-cyclopentyl ether

The 3-cyclopentyl ether of 17α-(1-propynyl)estradiol, obtained as described in Preparation 2, was treated with benzoyl chloride in chloroform solution containing pyridine by a procedure similar to that described in Method (a) of Example 1 and converted into the corresponding 17-benzoate; $\lambda_{max}$ 280 and 288 m$\mu$ ($\epsilon$ 2310 and 1830).

The title compound was also prepared by converting 17α-(1-propynyl)estradiol into the corresponding 3,17-dibenzoate and by subjecting this intermediate to partial hydrolysis and subsequent etherification with cyclopentyl bromide according to the conditions described in Method (b) of Example 1.

EXAMPLE 5

17-benzoate of 17α-(1-butynyl)estradiol 3-cyclopentyl ether

The 3-cyclopentyl ether of 17α-(1-butynyl)estradiol, obtained as described in Preparation 3, was esterified with benzoyl chloride under the conditions described in Method (a) of Example 1 to give the corresponding 17-benzoate, $\lambda_{max}$ 279 and 288 m$\mu$ ($\epsilon$ 2380 and 1835).

EXAMPLE 6

17-p. chlorobenzoate of 17α-chloroethynyl estradiol 3-cyclopentyl ether

The above compound was prepared by reacting the 3-cyclopentyl ether of 17α-chloroethynyl estradiol with p. chlorobenzoyl chloride by the procedure described in Example 2. The compound shows $\lambda_{max}$ 279 m$\mu$ ($\epsilon$ 2250), and 288 m$\mu$ ($\epsilon$ 1795).

EXAMPLE 7

Repeating the procedure of Example 2 by reacting the appropriate 17α-propynyl (or 17α-butynyl)estradiol 3-cyclopentyl ether with p. chlorobenzoyl chloride, according to the conditions described in Method (a) of Example 1, the following compounds were prepared:

17-p. chlorobenzoate of 17α-(1-propynyl)estradiol 3-cyclopentyl ether, $\lambda_{max}$ 280 m$\mu$ ($\epsilon$ 2220) and 288–289 m$\mu$ ($\epsilon$ 1815); and 17-p. chlorobenzoate of 17α-(1-butynyl)estradiol 3-cyclopentyl ether, $\lambda_{max}$ 278–279 m$\mu$ ($\epsilon$ 2410) and 288 m$\mu$ ($\epsilon$ 1840).

EXAMPLE 8

Repeating the procedure (Method (a)) of Example 1 by reacting 17α-ethynyl estradiol 3-cyclopentyl ether with an appropriate substituted benzoyl chloride, the following 17-esters of quinestrol were prepared: 17-p. fluorobenzoate, 17-m. chlorobenzoate, 17-m. fluorobenzoate, 17-o. fluorobenzoate, 17-o. chlorobenzoate, 17-ortho, meta and para toluate, 17-ortho, meta and para anisate, 17-p. methoxybenzoate, 17-p. ethoxybenzoate, 17-p. isopropyloxybenzoate and 17-p. nitrobenzoate of 17α-ethynyl estradiol 3-cyclopentyl ether.

EXAMPLE 9

Pharmacological tests

The prolonged estrogenic activity of the compounds of this invention was determined on the well known uterotrophic activity test which was performed as follows: Wistar female spayed rats, weighing about 45–50 g., were used. On the day following ovariectomy, a single dose of 0.2 $\mu$mole of the test steroids in solution of 0.2 ml. of sesame oil, was given by oral route while control rats received the vehicle only. Twenty rats were treated with each steroid and subdivided in two groups of 10 animals each. The first group was sacrified one week later and the second group three weeks after treatment. Uterus weight of the treated and untreated animals was accurately determined on a torsion balance. The increase of the uterus weight was considered as an index of the estrogenic potency of the tested steroid.

TABLE I.—PROLONGED UTEROTROPHIC ACTIVITY IN RATS

| Compound (oral treatment) | Single dose of— | | Uterus weight (mg.) after— | |
|---|---|---|---|---|
| | $\mu$Moles | Mg. | 1 week | 3 weeks |
| Controls | | | 26.9±3.2 | 17.8±1 |
| VS 100 quinestrol (17α-ethynyl estradiol 3-cyclopentyl ether) | 0.2 | 0.0730 | 45.0±1.6 | 32.0±1.5 |
| VS 3665 quinestrol 17-phenylethylacetate | 0.2 | 0.1022 | 31.9±2.3 | 28.1±1.6 |
| VS 3647 quinestrol 17-benzoate | 0.2 | 0.0938 | 73.4±4.4 | 44.2±2.2 |
| VS 3694 quinestrol 17,chlorobenzoate | 0.2 | 0.1006 | 71.7±4.2 | 43.2±1.8 |

The results reported in Table I indicate that the 17-benzoate and 17-chlorobenzoate of quinestrol possess a higher and more prolonged estrogenic activity as compared with that of the parent steroid. The activity of the above compounds may be calculated to be about three times more protracted than that of quinestrol since at the end of the 3rd week it was found to be practically equivalent to that shown by the parent 17-free alcohol at the 1st week. This prolongation of activity appears to be selective for the 17-benzoates, since the experiment shows that the esterified quinestrol in the form of 17-phenylethylacetate has a reduced estrogenic activity.

The ovarian inhibition shown by the 17-esters of this invention was determined on parabiotic rats and compared with that of quinestrol (17α-ethynylestradiol 3-cyclopentyl ether) using the antigonadotrophic activity assay carried out as follows:

The compounds under examination were orally given in a single dose in sesame oil solution to groups of parabiotic rats (each group consisting of 10 couples of animals), while control rats received the vehicle only. The interval between the beginning of the treatment and the autopsy of the animals varied from 16 to 32 days. At the end of the treatment, the ovarian weight of the treated and untreated animals was accurately determined. The results reported in Table II demonstrate that quinestrol 17-benzoate induces an increased and more lasting ovarian inhibition as compared with that obtained by administering a 5 times higher dose of quinestrol free alcohol. Gonadotrophic inhibition lasted for an average of 16 days after administration of quinestrol and of 32 days after treatment with the 17-benzoate compound.

This high and prolonged anti-gonadotrophic activity appears to be selective for the 17-benzoate since the experiment shows that the esterified quinestrol, for example in the form of 17-phenyl-ethylacetate, causes an ovarian inhibition similar to that induced by quinestrol free alcohol.

TABLE II.—PROLONGED ANTIGONADOTROPHIC ACTIVITY

| Compound (oral treatment) | Single dose of— | | Percent ovarian inhibition vs. controls after— | | |
|---|---|---|---|---|---|
| | μMoles | Mg. | 16 days | 24 days | 32 days |
| VS 100 quinestrol (17α-ethynyl estradiol 3-cyclopentyl ether) | 0.5 | 0.1825 | 15 | <10 | <10 |
| Do | 2.5 | 0.9125 | 50 | 15 | <10 |
| VS 3665 quinestrol 17-phenyl-ethylacetate | 0.5 | 0.2555 | 20 | 15 | <10 |
| VS 3647 quinestrol 17-benzoate | 0.5 | 0.2345 | 65 | 60 | 40 |
| VS 3694 quinestrol 17-chlorobenzoate | 0.5 | 0.2511 | 55 | 25 | 20 |

A further experiment was performed on male rats with the above compounds and a strong inhibition of testes was observed on the day of castration. In Table III there are reported the results obtained by administering orally a single dose of the test compounds to 10 adult male rats and determining 15 days later the weight of the sexual glands of the treated and untreated animals.

TABLE III

| Compound (oral treatment) | Single dose at— | | Testes weight at day 15 (mg.) | Percent inhibition vs. controls |
|---|---|---|---|---|
| | μMoles | Mg. | | |
| Controls | | | 824 | |
| Quinestrol | 0.5 | 0.1825 | 319 | 39 |
| Do | 2.5 | 0.9125 | 413 | 50 |
| Quinestrol 17-phenyl-ethylacetate | 0.5 | 0.2555 | 567 | 31 |
| Quinestrol 17-benzoate | 0.5 | 0.2345 | 208 | 75 |
| Quinestrol 17-chlorobenzoate | 0.5 | 0.2511 | 260 | 68 |

It will observed from Table III that the 17-benzoate of quinestrol exhibit an inhibiting effect by far superior to that shown by quinestrol when given at a 5 times higher dose.

EXAMPLE 10

Tablets for oral use containing 0.1 mg. of 17-benzoate of 17α-ethynylestradiol 3-cyclopentyl ether are prepared by mixing the product with the usual carriers for pharmaceutical formulations, such as calcium or magnesium stearate, talc, starch, lactose and the like.

A preparation suitable for oral use may be obtained by dissolving the active ingredient in sesame oil at a concentration of 0.2% and pouring the solution into 0.5 ml. gelatine microcapsules so that each capsule contains 1 mg. of the active compound.

EXAMPLE 11

A mixture was prepared containing oatmeal, millet and quinestrol 17-benzoate in glycerine solution at a concentration of 0.02%. The mixture was employed to prepare baits for a population of rats located in a waste area constantly under observation. Baits were placed every two weeks for three consecutive months. At the end of treatment a strong reduction of the pregnancy incidence was observed. At least one-half of the females did not become pregnant while those who did, brought forth, in most cases, immature animals.

What is claimed is:

1. A compound of the formula:

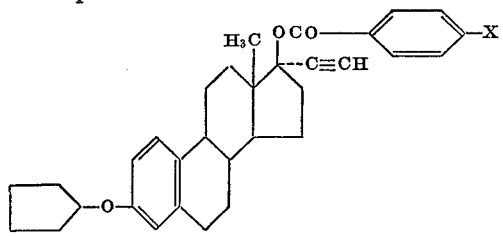

where X represents hydrogen or a *para*-chloro group.

2. The compound as defined in claim 1 which is the 17-benzoate of 17α-ethynyl estradiol 3-cyclopentyl ether.

3. The compound as defined in claim 1 which is the p. chlorobenzoate of 17α-ethynyl estradiol 3-cyclopentyl ether.

References Cited

UNITED STATES PATENTS

| 3,159,543 | 12/1964 | Ercoli | 167—74 |
| 2,885,413 | 5/1959 | Hogg et al. | 260—397.45 |
| 3,359,261 | 12/1967 | Anner et al. | 260—239.55 |
| 3,374,230 | 3/1968 | Gardner et al. | 260—239.55 |

HENRY A. FRENCH, Primary Examiner

U.S. Cl. X.R.

424—238